(12) United States Patent
Barber et al.

(10) Patent No.: US 7,765,061 B1
(45) Date of Patent: Jul. 27, 2010

(54) FLIGHT DISPLAY SYSTEM WITH ENHANCED TEMPORAL DEPICTION OF NAVIGATION INFORMATION

(75) Inventors: Sarah Barber, Robins, IA (US); Kirschen A. Seah, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 939 days.

(21) Appl. No.: 11/436,846

(22) Filed: May 18, 2006

(51) Int. Cl.
*G01C 21/00* (2006.01)
(52) U.S. Cl. .................. 701/206; 701/204; 701/207; 701/211
(58) Field of Classification Search .................. 701/3, 701/7, 14–16, 200–202, 206, 211–212, 123, 701/204; 340/945, 971, 973
See application file for complete search history.

(56) References Cited

U.S. PATENT DOCUMENTS

| | | | | |
|---|---|---|---|---|
| 4,870,412 A | * | 9/1989 | Vuichard | 340/946 |
| 5,121,325 A | * | 6/1992 | DeJonge | 701/123 |
| 6,112,141 A | * | 8/2000 | Briffe et al. | 701/14 |
| 6,163,743 A | * | 12/2000 | Bomans et al. | 701/3 |
| 6,832,138 B1 | * | 12/2004 | Straub et al. | 701/3 |
| 6,985,091 B2 | * | 1/2006 | Price | 340/975 |

\* cited by examiner

*Primary Examiner*—Yonel Beaulieu
(74) *Attorney, Agent, or Firm*—Matthew J. Evans; Daniel M. Barbieri

(57) ABSTRACT

In one aspect, the flight display system comprises a navigation map that includes a time window for a required time of arrival (RTA) waypoint. The time window has a proximal end indicating the aircraft's position at the RTA using a defined lowest speed and a distal end indicating the aircraft's position at the RTA using a defined highest speed. In another aspect, a pop-up time map displays flight plan waypoints mapped out along a time line adjacent to a plurality of time markers. The waypoint scrolls along the time line during flight. In another aspect, the flight display system includes a full format time map for displaying at least one flight plan waypoint mapped out along a time line adjacent to a plurality of time markers. In another broad aspect, a time/bearing map includes a plurality of concentric "range" rings corresponding to selected times in the future; a plurality of radially spaced bearing ticks positioned at selected locations about the concentric rings; and, a relative time ring presentable about a central axis of, and internal to, the concentric rings. The relative time ring represents a fixed increment in time. Selected waypoints are presentable at their relative bearing to the airplane and at their range (in time) from the airplane.

22 Claims, 16 Drawing Sheets

```
  ACT   RTA  PROGRESS          2/3
   RTA  WPT                     RTA
 EPH                       1031:00z
   RTA  SPD            TIME  ERROR
 250/ 633         EARLY      01:30
   RTA  REST                   GMT
 250/10000                 1000:30z
 DIST----TO  EPH           ----ETA
   25NM                    1010:30z
 FIRST--RTA  WINDOW---LAST
 1008:23z                  1010:30z

<LIMITS
```

FIG. 1

FLIGHT DISPLAY SYSTEM WITH ENHANCED TEMPORAL DEPICTION OF NAVIGATION INFORMATION

BACKGROUND OF THE INVENTION

1. Field of the Invention

The present invention relates generally to aircraft instrumentation displays and more particularly to the enhancement in the display of an avionics flight display with enhanced temporal depiction of navigation information.

2. Description of the Related Art

Some Flight Management Systems (FMS) for aircraft provide a Required Time of Arrival (RTA) function, which can be associated with one or more waypoints. This type of function is necessary to enable 4-D navigation, which requires the airplane to pass over a given waypoint at a certain time. With today's navigation systems, a tolerance of 30 seconds is typically allowed at the RTA waypoint.

Today, the pilot sets up the RTA for a waypoint by selecting an FMS Control Display Unit (CDU) page, as shown in the example below. FIG. 1 (Prior Art) shows a page that currently exists on the Smith's FMS (Boeing 737). When the RTA waypoint has been input, the FMS calculates a time window, which shows the earliest and latest times that the airplane could arrive at that waypoint based on airplane performance and atmospheric conditions. Currently, there is no method for graphically displaying a type of "Time Window" on the typical navigation map. This is because both times reference the same spatial location. All that can be provided is a text display of the earliest and latest arrival times.

Furthermore, with the inevitable increase in reliance on 4-D navigation in the future, there appears to be a need to increase the pilot's Situation Awareness of the airplane's constraints within the time domain.

SUMMARY OF THE INVENTION

In a broad aspect, the present invention is a flight display system for an avionics system of an aircraft. The flight display system comprises a navigation map that includes a time window for a required time of arrival (RTA) waypoint. The time window has a proximal end indicating the aircraft's position at the RTA using a defined lowest speed and a distal end indicating the aircraft's position at the RTA using a defined highest speed.

In another broad aspect, the flight display system comprises a navigation map that includes a pop-up time map for displaying at least one flight plan waypoint mapped out along a time line adjacent to a plurality of time markers. The waypoint scrolls along the time line during flight.

In another broad aspect, the flight display system includes a full format time map for displaying at least one flight plan waypoint mapped out along a time line adjacent to a plurality of time markers.

In another broad aspect, the flight display system comprises a time/bearing map, including a plurality of concentric "range" rings corresponding to selected times in the future; a plurality of radially spaced bearing ticks positioned at selected locations about the concentric rings; and, a relative time ring presentable about a central axis of, and internal to, the concentric rings. The relative time ring represents a fixed increment in time. Selected waypoints are presentable at their relative bearing to the airplane and at their range (in time) from the airplane.

As used herein, the term "waypoint" is defined broadly to represent any ground-based object (such as a navigation aid, obstacle, city etc.) including a pilot-defined waypoint (such as latitude/longitude), any air-based object (such as other air traffic) and any selected event in time (such as a point-of-no-return, point of fuel exhaustion, etc).

BRIEF DESCRIPTION OF THE DRAWINGS

FIG. 1 (Prior Art) shows a progress page that currently exists on the Smith's FMS (Boeing 737).

DETAILED DESCRIPTION OF THE INVENTION

Figure 2:
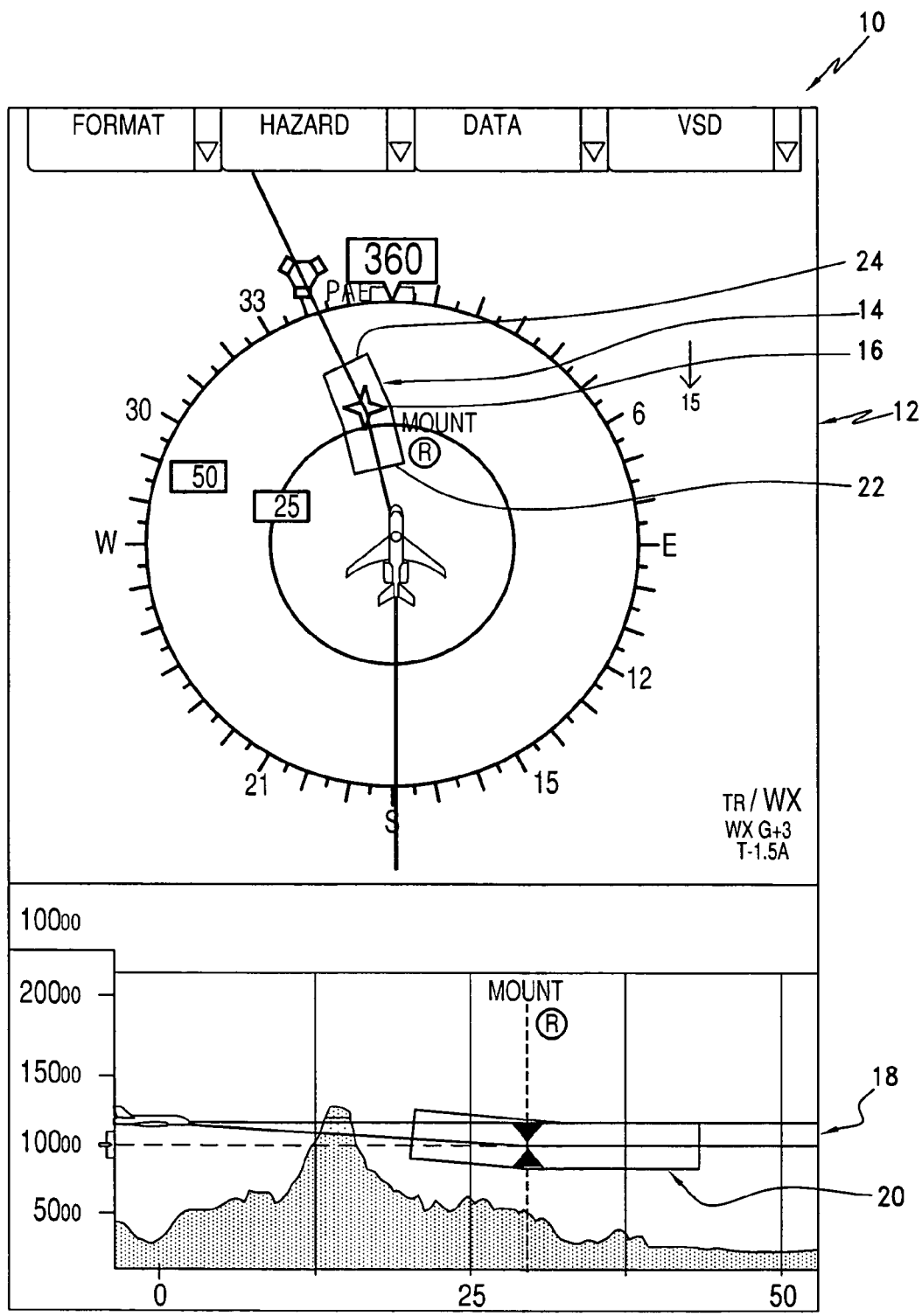
FIG. 2 shows a flight display in accordance with a first embodiment of the present invention, with an upper navigation map including a time window shown thereon.

Referring now to FIG. 2 a flight display system, designated generally as 10, is illustrated in accordance with the principles of the present invention. In this figure, the flight display system 10 includes two navigation maps. The upper navigation map is a lateral map 12 that includes a two-dimensional box, designated generally as 14, representing a time window for a required time of arrival (RTA) waypoint 16. The lower navigation map is a vertical situation display 18. In this display 18 the time window is also depicted as a two-dimensional box 20.

Each time window i.e. spatial envelope, e.g. box 14, includes a proximal end 22 indicating a spatial location of the aircraft's position at the RTA using a defined lowest speed and a distal end 24 indicating a spatial location of the aircraft's position at the RTA using a defined highest speed. This defined lowest speed is typically the slowest cruise speed.

However, it may represent other speeds such as the minimum flaps operating speed or approach speed. The defined highest speed is typically the maximum operating speed.

In operation, once the RTA has been entered in the flight management system (FMS), it is possible to display the time window 14 to show any dynamic variability in the airplane's performance with respect to the RTA waypoint 16. The pilot can be made continually aware of the time window by graphically depicting the maximum and minimum performance limits with respect to the RTA waypoint 16. As the airplane flies towards the RTA waypoint 16, the box 14 would typically start to shrink around the waypoint 16. This is because there would be less time and distance for any change in cruise speed to take effect. As the airplane approaches the waypoint 16, the tunnel length would shrink to zero.

If atmospheric conditions were to change such that the airplane started to lose or gain ground speed (e.g. headwind or tailwind) with the RTA already set for the waypoint, it may become impossible for the airplane to slow down or speed up enough to make the RTA. In this case, the pilot would observe one end of the time window starting to move towards the waypoint and, at some point, pass the waypoint. If the RTA waypoint lies outside the time window, then RTA is not achievable. Although the FMS certainly would provide a message to indicate that the RTA can no longer be satisfied, the movement of the time window boundaries (trend) would indicate to the pilot at a much earlier stage that RTA may be in jeopardy.

Figure 3:
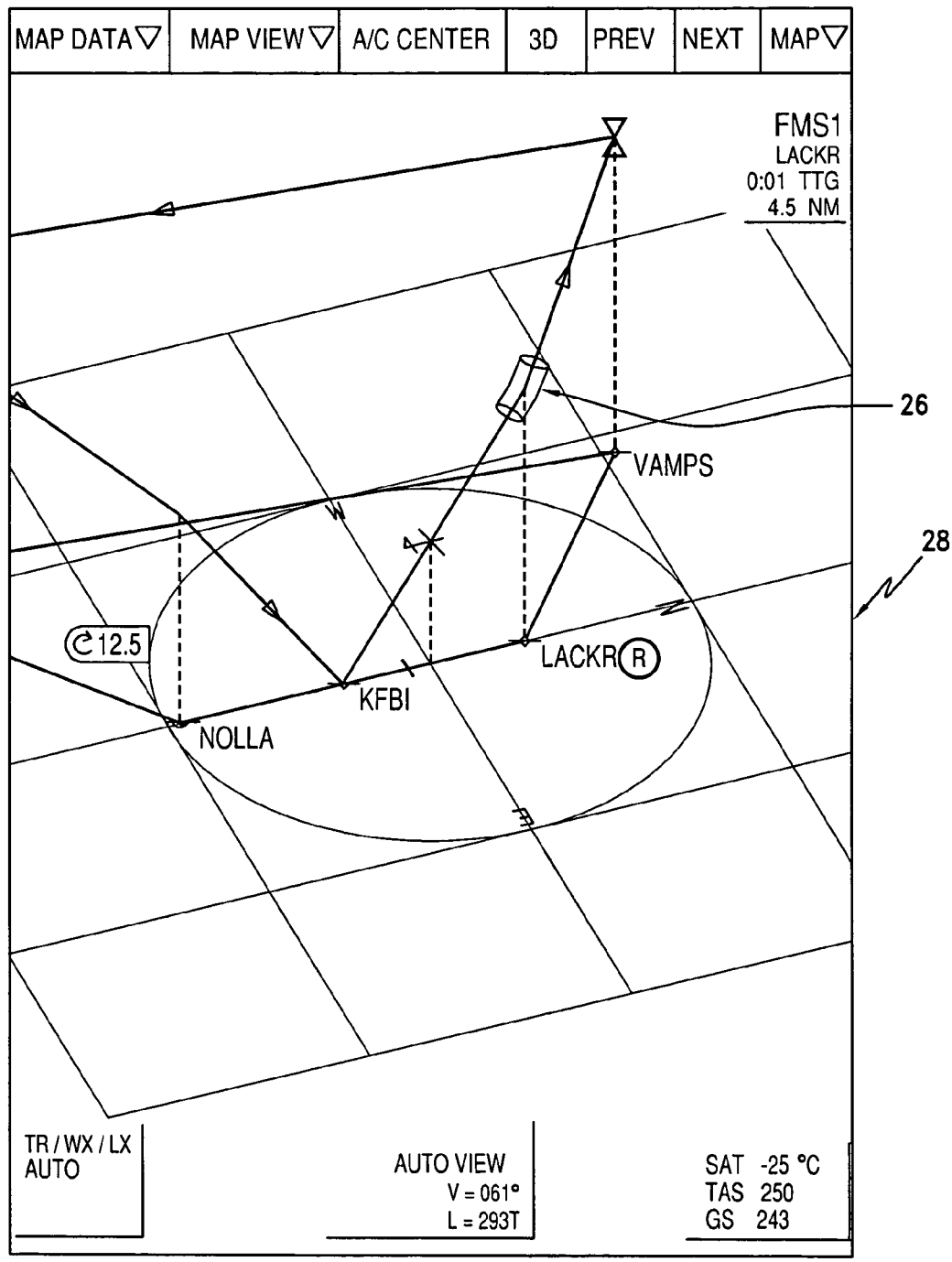
FIG. 3 shows a three-dimensional map display having a time window.

Referring now to FIG. 3, this use of a graphical depiction of a time window can be extended to a three-dimensional tunnel 26 in a three-dimensional map display 28.

The above solutions only allow for a pseudo depiction of the RTA window once an RTA has been established for a waypoint. Although the FMS provides two time limits (earliest and latest arrival times) for the waypoint, both of these times are relative to the same waypoint, and occupy the same point in space.

With the inevitable increase in reliance on 4-D navigation in the future, there appears to be a need to increase the pilot's Situation Awareness of the airplane's constraints within the time domain. In particular, it should be possible to indicate an arrival time (or window) for any waypoint, before selection as an RTA waypoint.

However, an airplane, by flying through a moving air mass is limited, not by a physical range, but by an endurance. This endurance is based on several factors including fuel load, atmospheric conditions (winds, temperatures), cruise speed etc. All of these parameters are available in either actual or predicted form within the FMS. As such, the FMS is able to create a time-based map of the airplane's progress.

As time is independent of direction in the physical world, the airplane's trajectory in three dimensions can be condensed into a single dimension in the time domain. This results in all the waypoints being presented sequentially on the time axis.

Substantial improvements in Situation Awareness could be obtained from the use of a Time-based map, for example:

a) a "Big Picture" view of all time-based constraints for the flight plan;

b) visualization of changes in time between waypoints as atmospheric conditions change (waypoint time intervals may compress or expand);

c) visualization of changes in time between waypoints due to changes in airplane speed;

d) visualization of time limits for fuel (reserve, minimum etc.);

e) visualization of multiple RTA waypoints and each one's earliest/latest arrival window.

Figure 4:
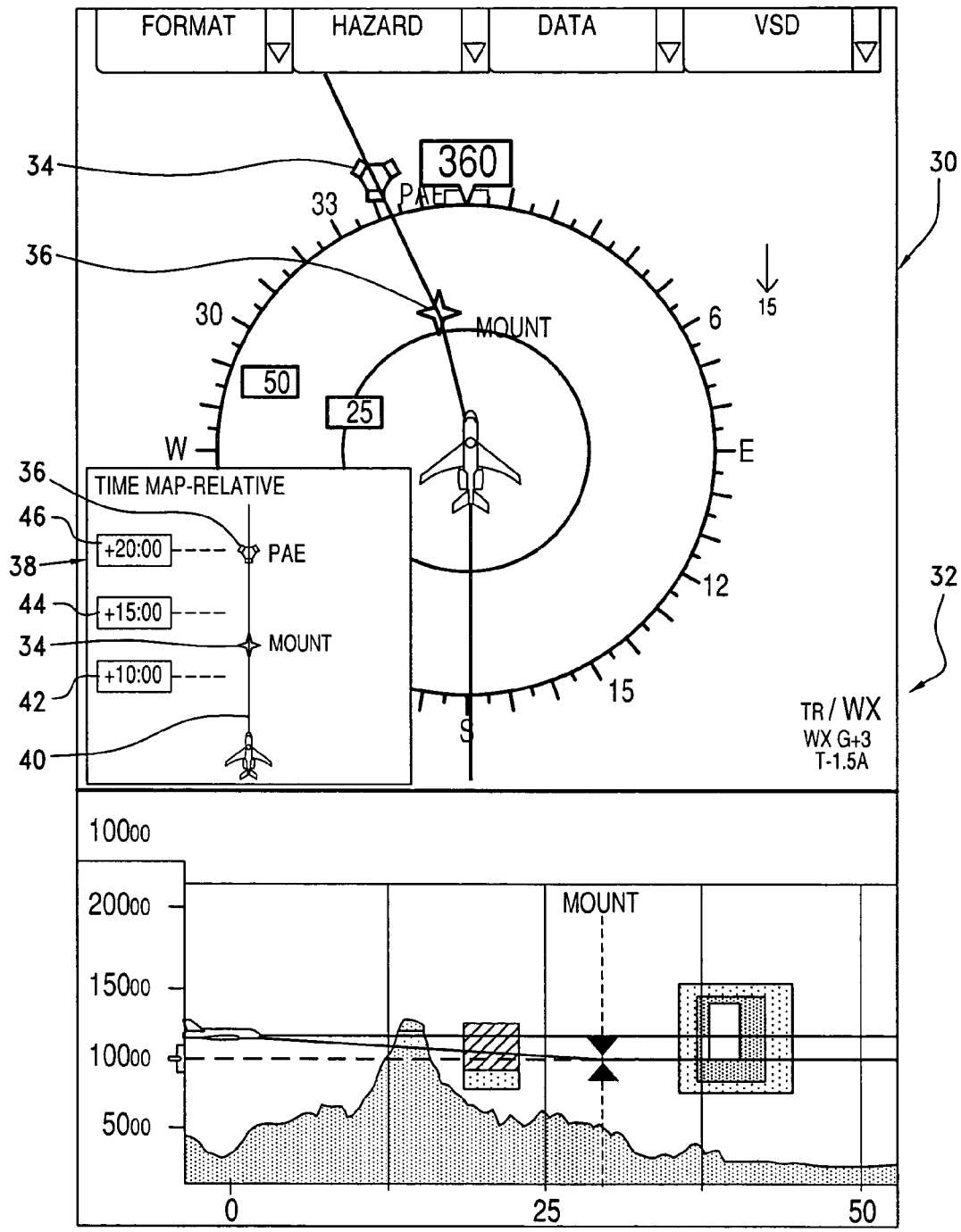
FIG. 4 shows a pop-up relative time map presented on a two-dimensional Present Position (PPOS) navigation map in the upper part of a display.

Referring now to FIG. 4, a 2-D Present Position (PPOS) navigation map 30 is illustrated in the upper part of the display 32. Waypoints 34, 36 are positioned in terms of polar coordinates (range and direction). The PPOS map 30 includes a pop-up time map, designated generally as 38, having the flight plan waypoints 34, 36 mapped out along a time line 40 adjacent to time markers 42, 44, 46. The waypoints 34, 36 scroll along the time line during flight. Given that the time axis is relative, the time-range remains fixed along the left side of the time map 38 with the waypoints scrolling past. In this example, the time markers are 42, 44, 46 are relative time markers.

Figure 5:
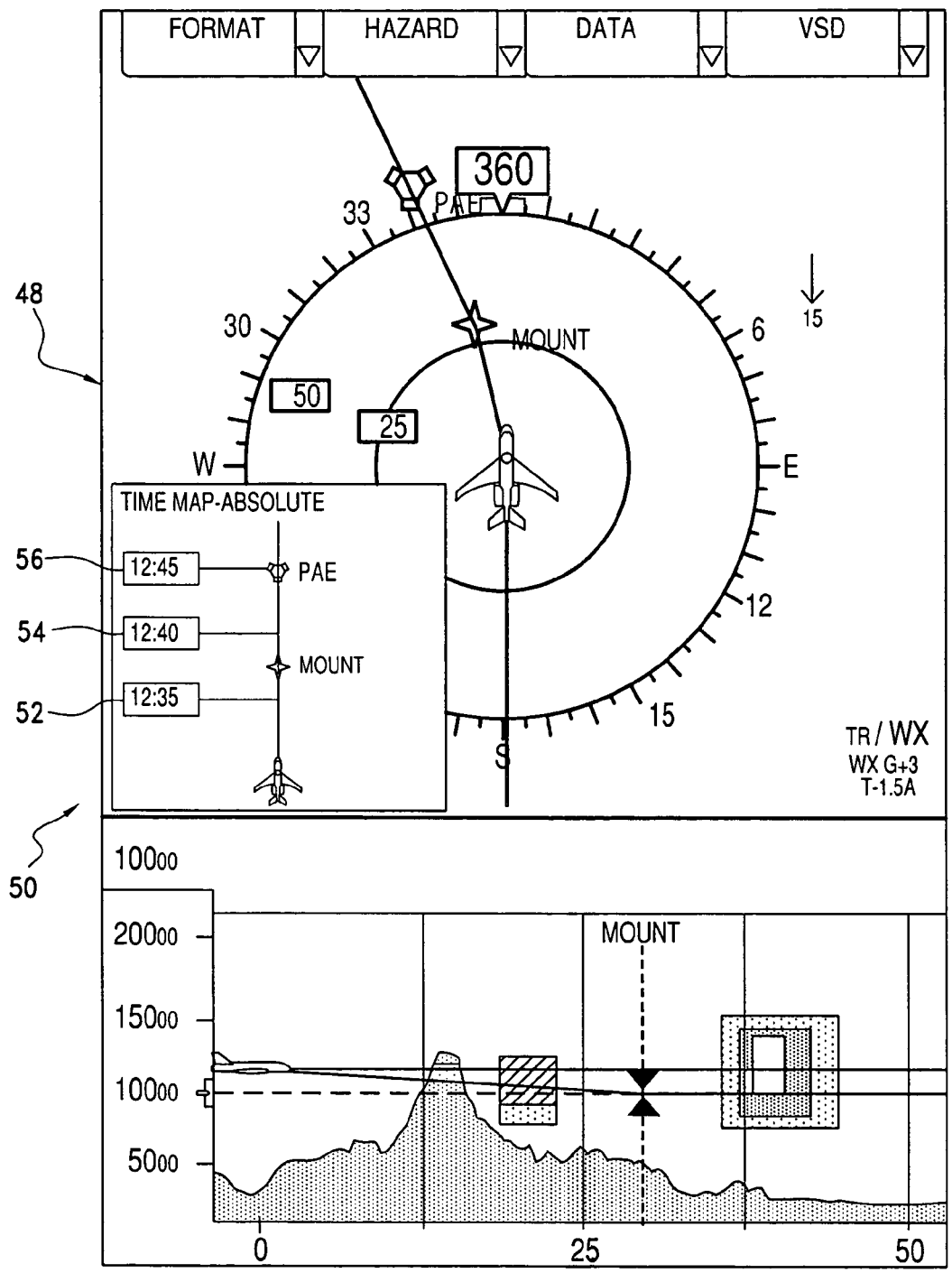
FIG. 5 shows a pop-up absolute time map presented on a two-dimensional Present Position (PPOS) navigation map in the upper part of a display.

Referring now to FIG. 5, a 2-D PPOS navigation map 48 is illustrated in the upper part of a display 50. In this example, the PPOS map 30 includes a pop-up time map, designated generally as 38, having absolute time markers 52, 54, 56. In this case, absolute times (probably in UTC) are pinned to the time axis. As the airplane progresses in time, the closest time box (12:35) would scroll off the screen and be replaced by a new time box at the top (12:50).

Figure 6:
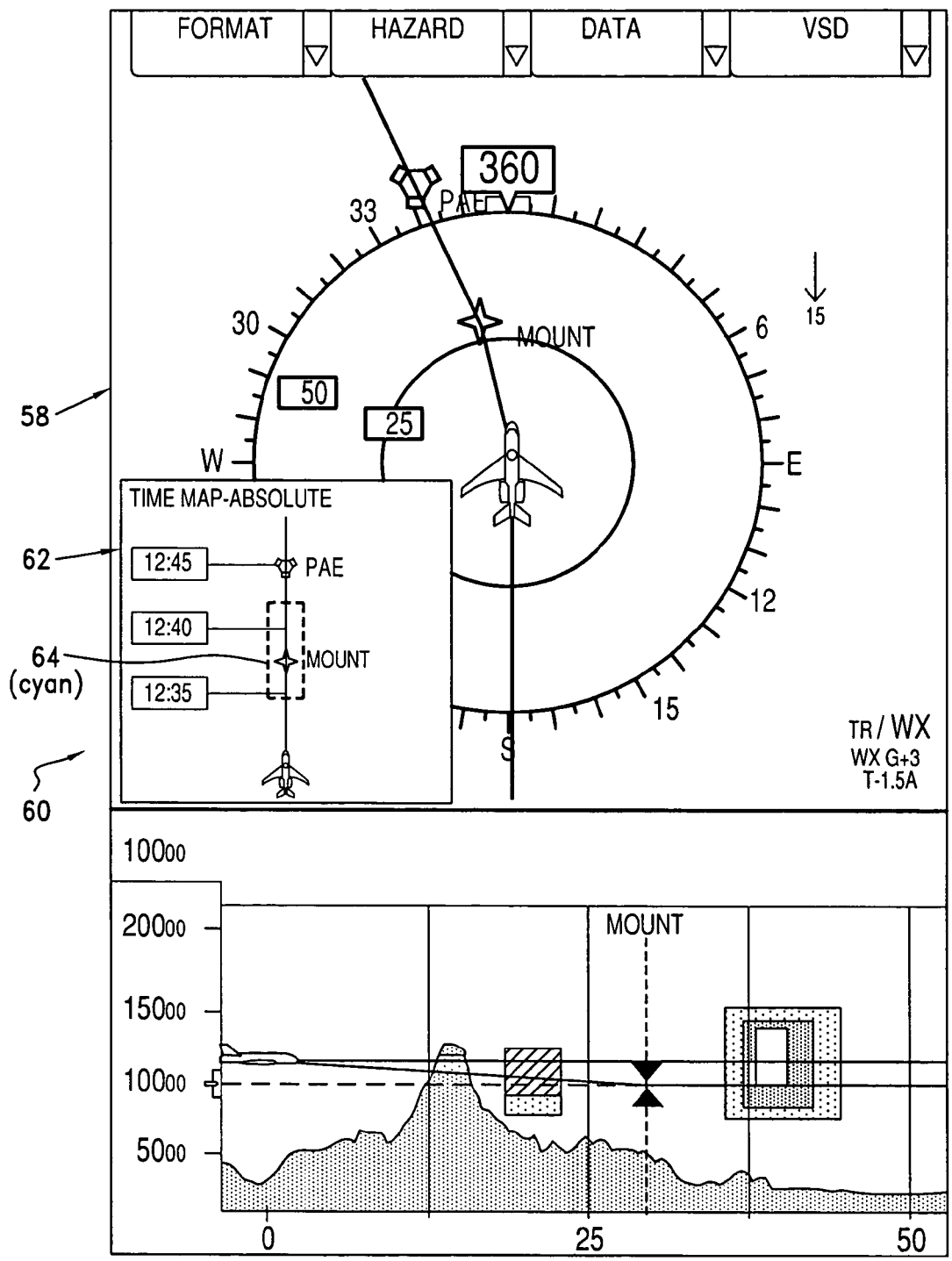
FIG. 6 shows a pop-up absolute time map with a waypoint RTA time window presented on a two-dimensional Present Position (PPOS) navigation map in the upper part of a display.

Referring now to FIG. 6, a 2-D PPOS navigation map 58 is illustrated in the upper part of a display 60 that includes a pop-up time map 62 having a waypoint RTA time window 64 presented thereon. Once a waypoint is designated (either graphically using an on-screen cursor or in the FMS), the earliest and latest arrival times can be shown by means of a box 64, for example a cyan colored box. This time window 64 could be displayed for any selected waypoint, not just a waypoint already identified as an RTA waypoint in the FMS. In the example shown, at present speed, the airplane will arrive at MOUNT at about 12:38. The earliest arrival time is just before 12:35 and the latest arrival time is around 12:42.

Figure 7:
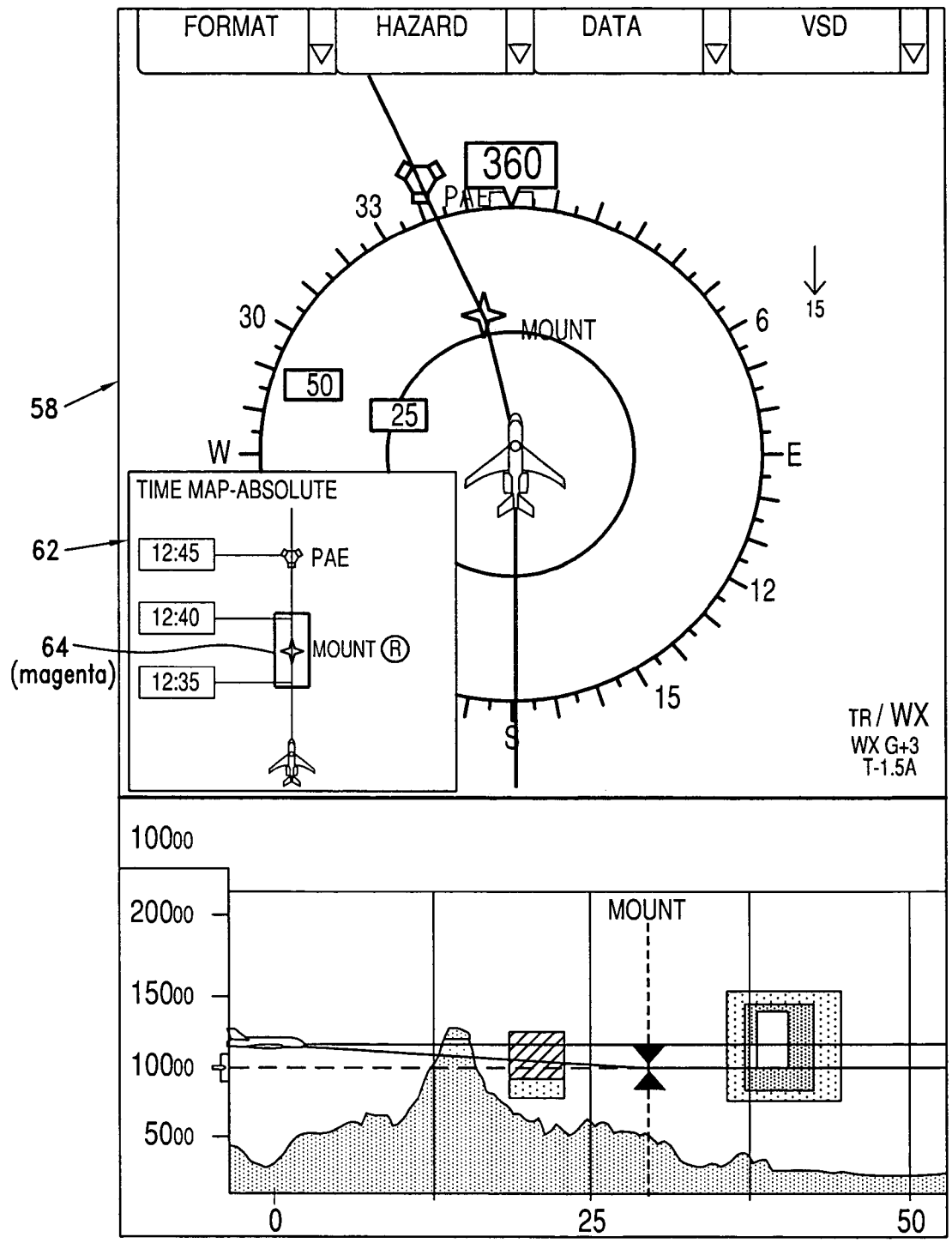
FIG. 7 shows the change of the pop-up absolute time map of FIG. 6 as a result of a change in pilot selection of a new RTA.
Figure 8:
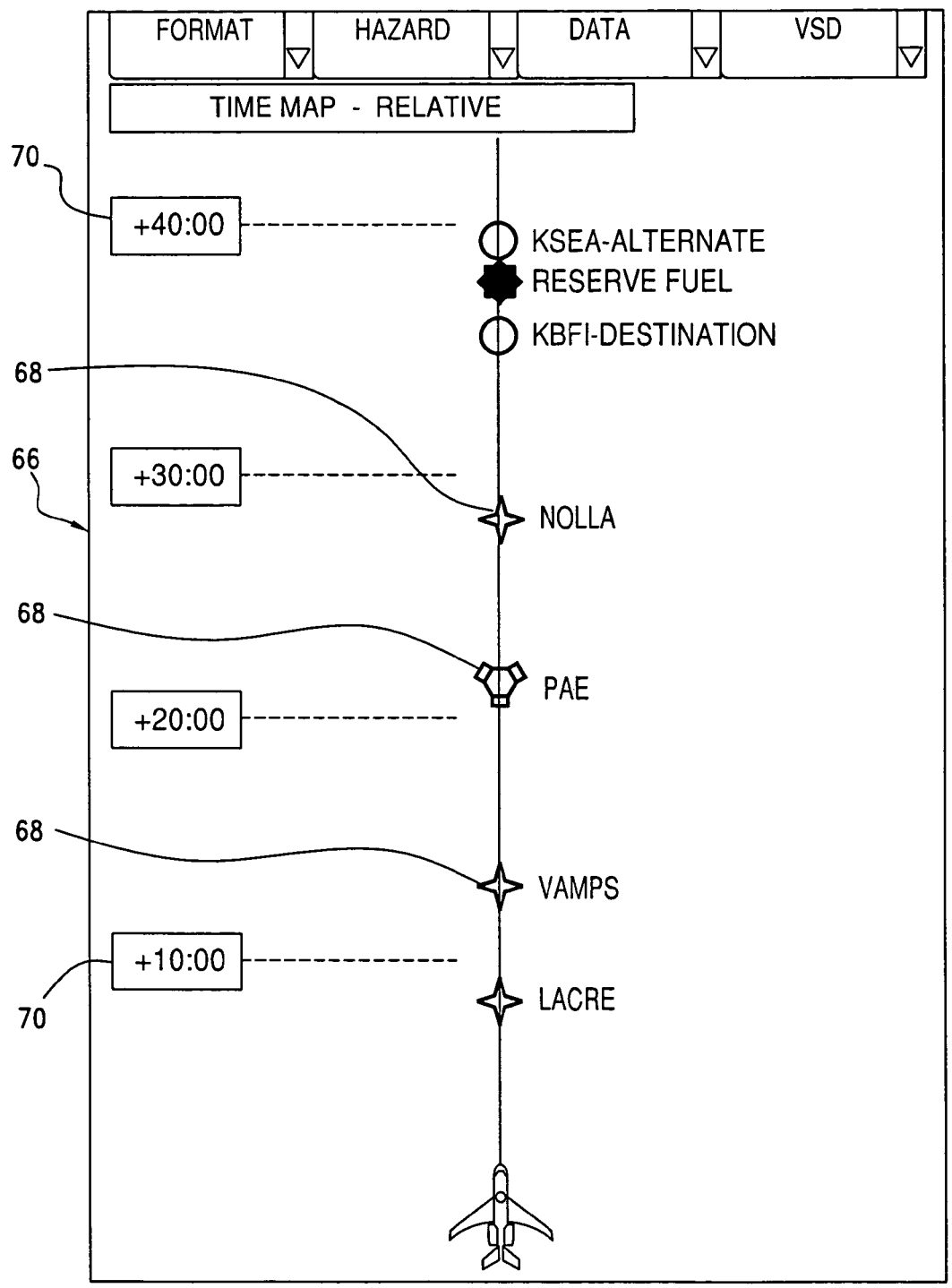
FIG. 8 is a full format relative time map having flight plan waypoints mapped out along a time line adjacent to time markers.

FIG. 7 shows what happens if the pilot selects 12:37 as the RTA. Waypoint MOUNT would shift in time to 12:37 and the earliest/latest arrival times would be indicated by the edges of the box 64. (It would also be desirable for the box to switch colors—for example box 64 might possibly switch from cyan to magenta.) Due to an increase in cruise speed (to get to MOUNT earlier), the subsequent waypoint (PAE) would also shift forward in time. As the airplane gets closer to MOUNT, the size of the box 64 would shrink, until disappearing at waypoint crossing. As the airplane gets closer to the waypoint, any change in cruise speed would have a diminishing effect on the arrival time. The ® in this figure denotes that the waypoint has an RTA constraint Referring now to FIG. 8, a full format time map is illustrated, designated generally as 66, having flight plan waypoints 68 mapped out along a time line adjacent to time markers 70. Based on fuel load and fuel flow, the FMS can calculate how much time is left until reserve fuel or fuel exhaustion. These limits may also be depicted on the time map 66. If the airplane needed to make an emergency landing, the FMS could depict the closest airports in time (irrespective of current airplane heading), rather than in distance, making use of its knowledge of the atmospheric conditions to get the airplane on the ground as soon as possible. ETOPS operations might also benefit from having diversion airports represented in time rather than in distance.

Figure 9:
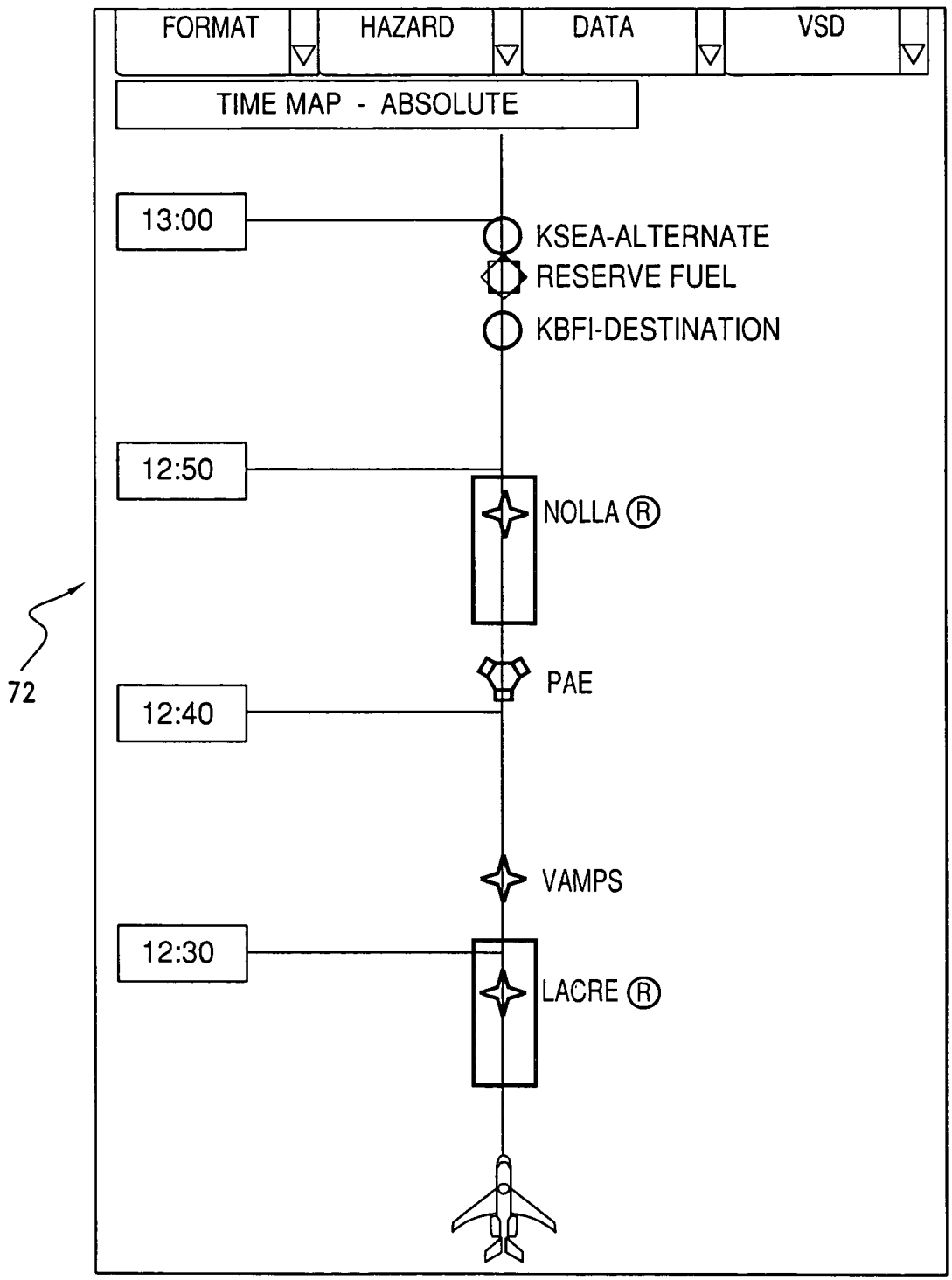
FIG. 9 is a full format absolute time map having flight plan waypoints mapped out along a time line adjacent to time markers, and illustrating two RTA time windows.

Referring now to FIG. 9, the Absolute version of the full format time map is shown, designated generally as 72, with multiple RTA waypoints. It becomes an easy matter for the pilot to monitor progress towards the required times of arrival, and detect any trends which may result in the airplane not being able to make a future RTA constraint. In addition, it becomes very straightforward to indicate additional time-based constraints, such as the initiation of reserve fuel consumption. Indicia such as the reserve fuel point could be highlighted in yellow, should reserve fuel be required to reach the destination airport.

Use of a time map with RTA has obvious value in being able to increase a pilot's Situation Awareness of the progress of the flight plan through time. Collapsing the "map" down to a single time dimension, does bring with it some disadvantages though. As long as waypoints (flight plan or not) "disappear" once they pass behind the airplane, there is no problem. However, if a waypoint's position on the time-line is defined solely by its time-range from the airplane, then as the airplane arrives at the waypoint, the waypoint would reverse direction and progress backwards along the time-line. This would probably be confusing, if not disconcerting to the pilot.

Figure 10:
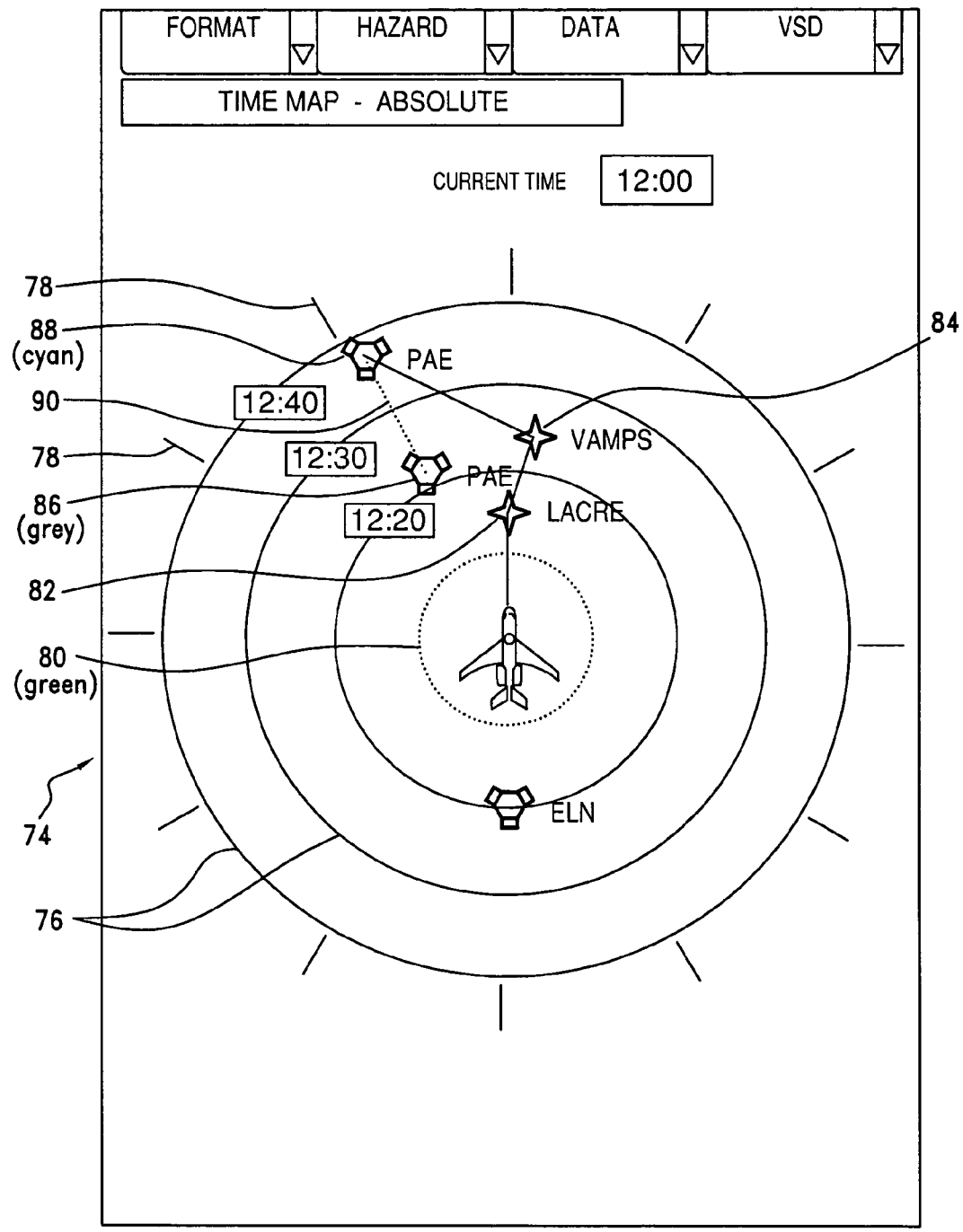
FIG. 10 shows a time/bearing map with absolute time-range rings and a relative time ring representing a fixed increment in time.

Therefore, referring now to FIG. 10, bearing in mind the problem stated above, a more comprehensible display may be achieved by constructing a Time/Bearing map, designated generally as 74.

The same benefits in Situation Awareness could be achieved from the Time/Bearing map 74, as for the single-dimension time map discussed above, i.e. for example:

a) a "Big Picture" view of all time-based constraints for the flight plan;

b) visualization of changes in time between waypoints as atmospheric conditions change (waypoint time intervals may compress or expand);

c) visualization of changes in time between waypoints due to changes in airplane speed;

d) visualization of time limits for fuel (reserve, minimum etc.);

e) visualization of multiple RTA waypoints and each one's earliest/latest arrival window.

The time/bearing map includes a plurality of concentric range rings 76 corresponding to selected times in the future. A plurality of radially spaced bearing ticks 78 are positioned at selected locations about the concentric rings 76. The bearing ticks 78 are shown placed at cardinal compass points around the range rings; however, a full compass arc could be used.

Figure 11:
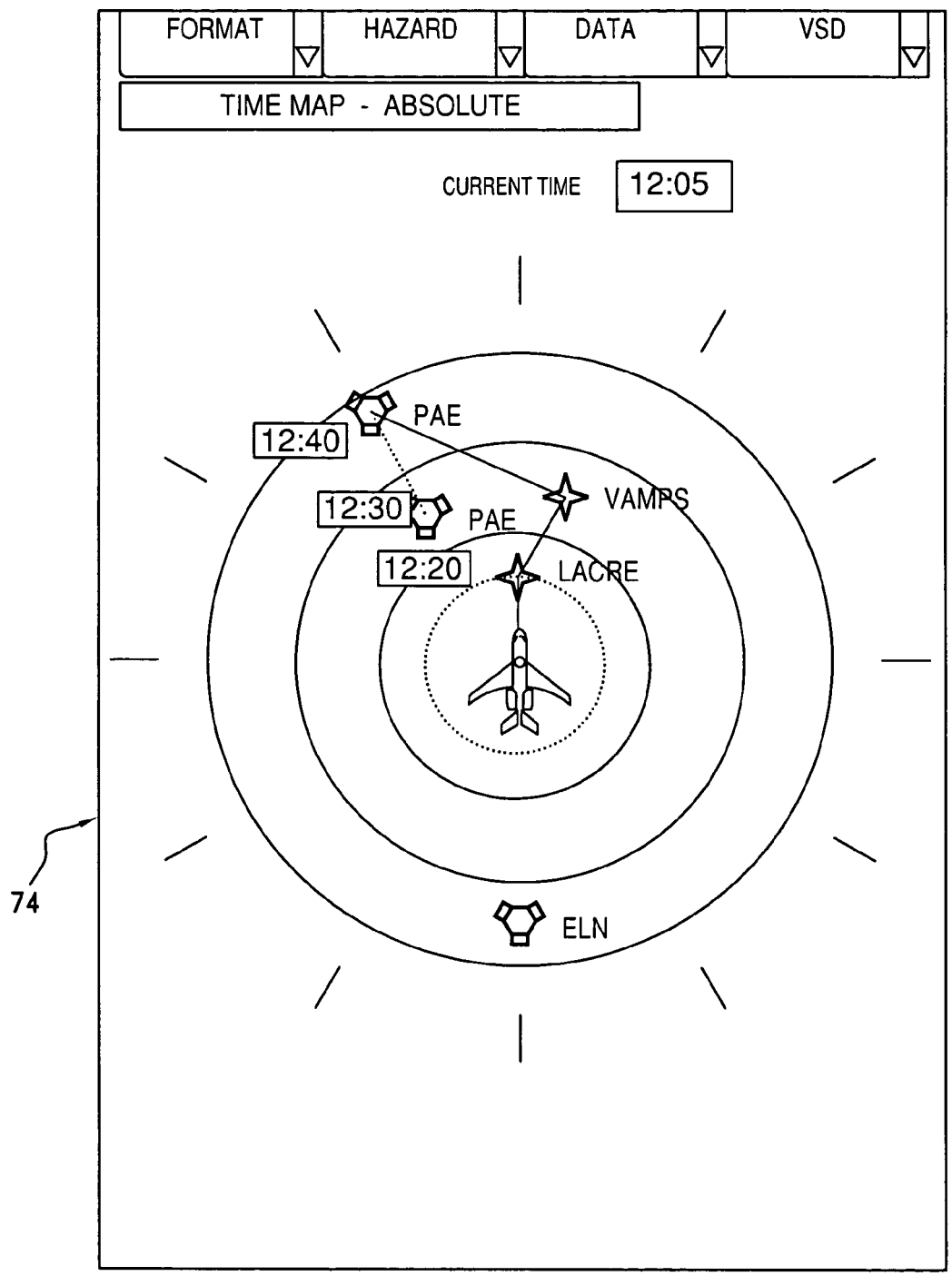
FIG. 11 shows the time/bearing map of FIG. 10, at a later time, showing progression of the time-range rings thereon.

A relative time ring 80 is presentable about a central axis of the concentric rings 76. The relative time ring 80 represents a fixed increment in time (e.g. 10 minutes). It is preferably a different color than the range rings 76. For example, it may be green. FIG. 10 illustrates the time/bearing map 74 as an absolute time map in action at the current airplane time (12:00). Waypoints 82, 84, 86, 88 are placed at their relative bearing to the airplane and at their time-range from the airplane (based on computed groundspeed to the waypoint). Waypoints/navaids on the flight plan may be connected by a line. Depicting all non flight plan waypoints/navaids or flight plan waypoints only poses no issues. However, a waypoint which is on the flight plan can now occupy two positions in time. The first position (i.e. numeral designation 86) is the current time-distance from the airplane (i.e. if a Direct-To were carried out). The second position is the arrival time according to the flight plan (i.e. numeral designation 88), which could include prior waypoint passage. The waypoint in question would be on the same bearing line from the airplane at any given time, only repeated at two different time-positions. Both these time-positions could be indicated on the map using a technique as shown in the figure. For example, the navaid-waypoint PAE (numeral designation 88) is on the flight plan and may be depicted using the "standard" map color for navaids (cyan). PAE can also be presented as a navaid in its own right (off flight plan, i.e. numeral designation 86), and in this case, perhaps depicted in grey. A dashed line 90 joins the two instances. As the airplane moves along in time, the grey PAE (86) would move closer to the cyan PAE (88) until, when passing VAMPS (84), they would become a single waypoint (FMS "TO" waypoint). This double presentation allows the pilot to observe the potential arrival time at any flight plan waypoint, should a Direct-To be initiated FIG. 11 shows the same map 74, but now at 5 minutes into the future (12:05). The absolute time-range rings have all moved towards the airplane, as have the waypoints/navaids. Those which are behind the airplane continue to move away in that direction. The placement of waypoints according to bearing is the main advantage of this method over the single time-line map.

Figure 12:
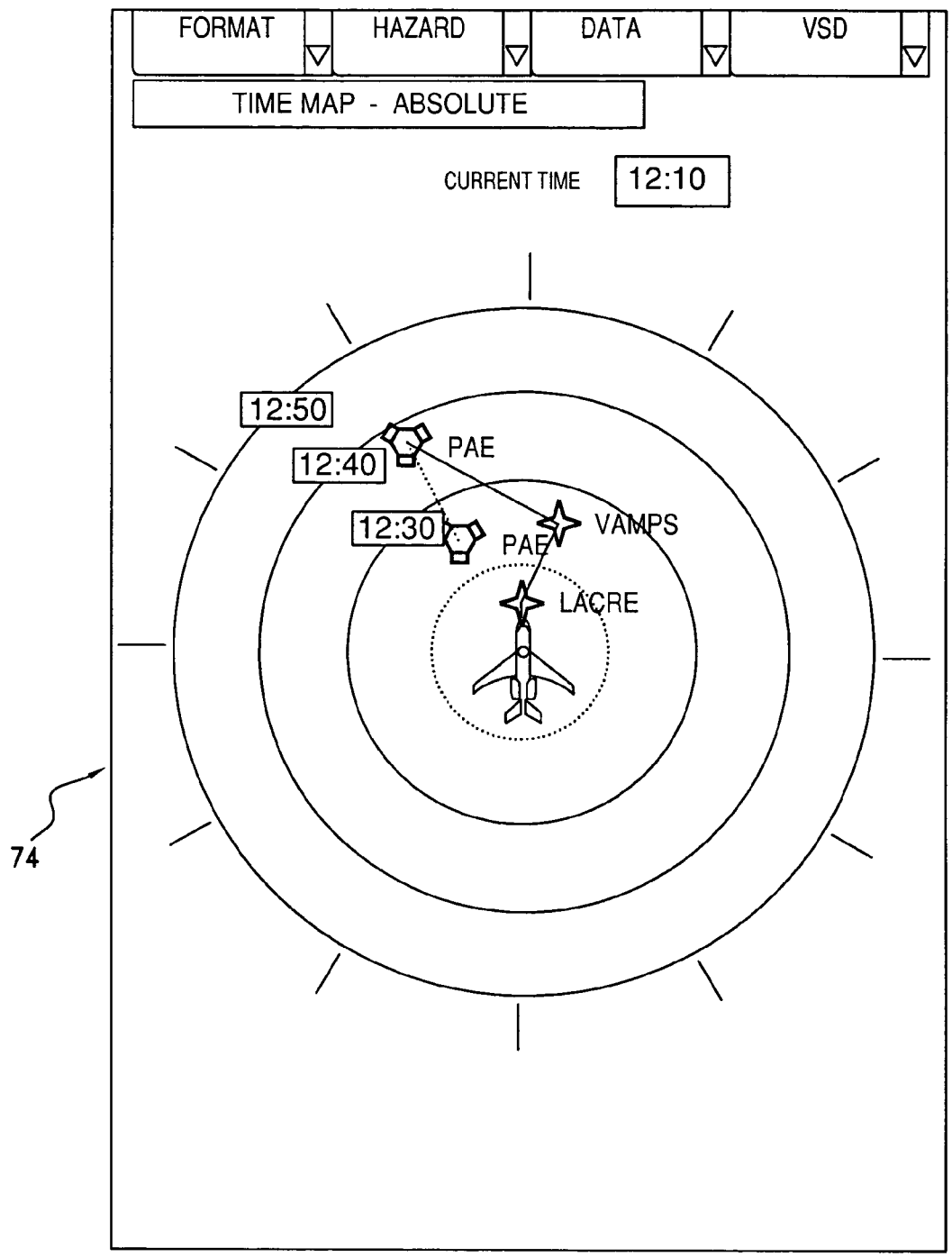
FIG. 12 shows a time/bearing map at a still later time than that of FIG. 11, showing further progression of the time-range rings thereon.

As shown in FIG. 12, when the innermost absolute time-range ring touches the relative time-range ring (i.e. at 10 minutes from the airplane in this case), the innermost absolute time-range ring disappears and a new outer time-range ring appears. The pattern of the three time-range rings progressing towards the airplane is now repeated.

Figure 13:
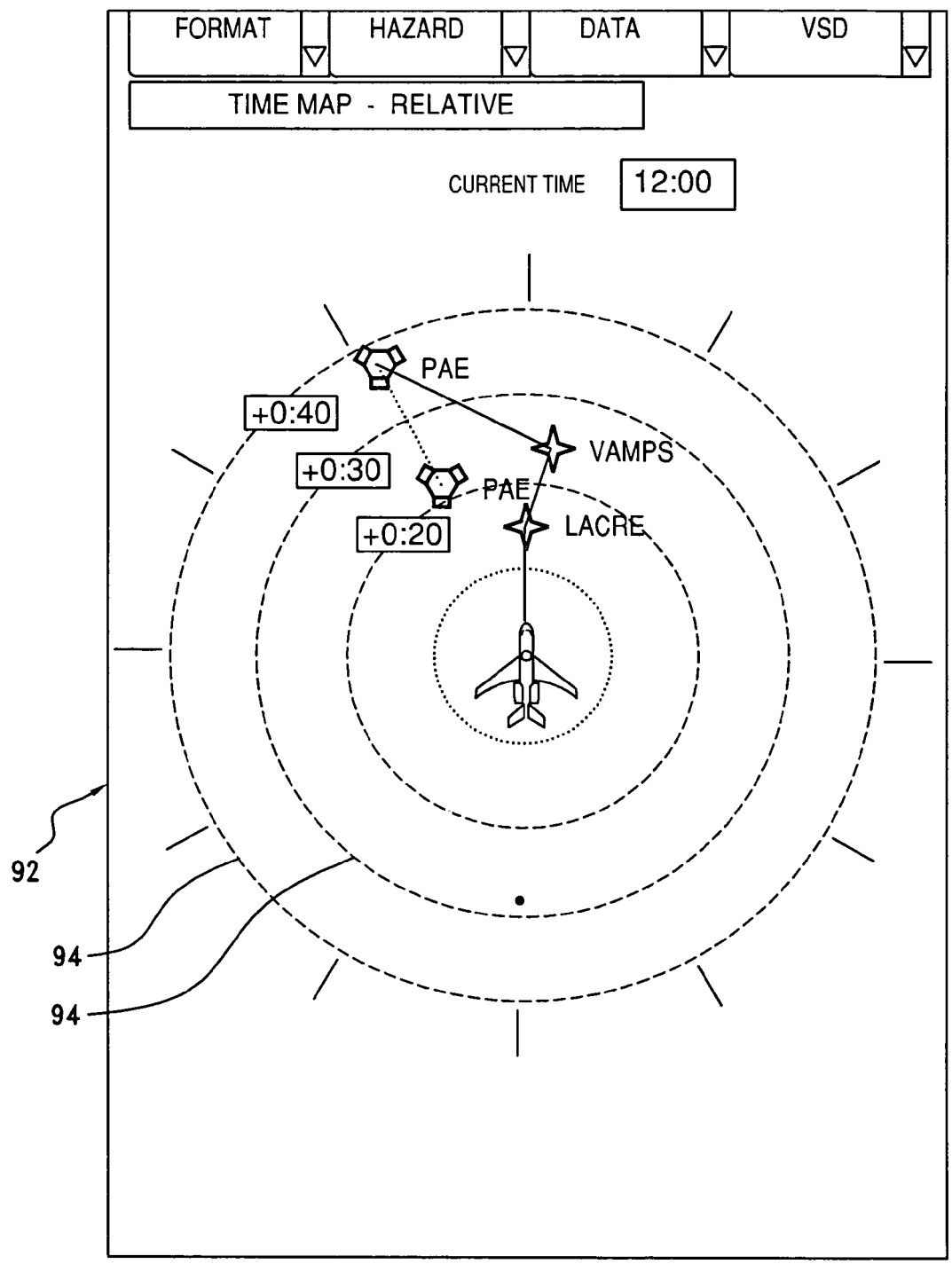
FIG. 13 shows a time/bearing map having only relative time-range rings.

FIG. 13 gives an illustration of how a time/bearing map 92 would look if only relative time-range rings 94 were displayed. In this case, the time-range rings 94 do not move . . . only the waypoints move through them.

Figure 14:
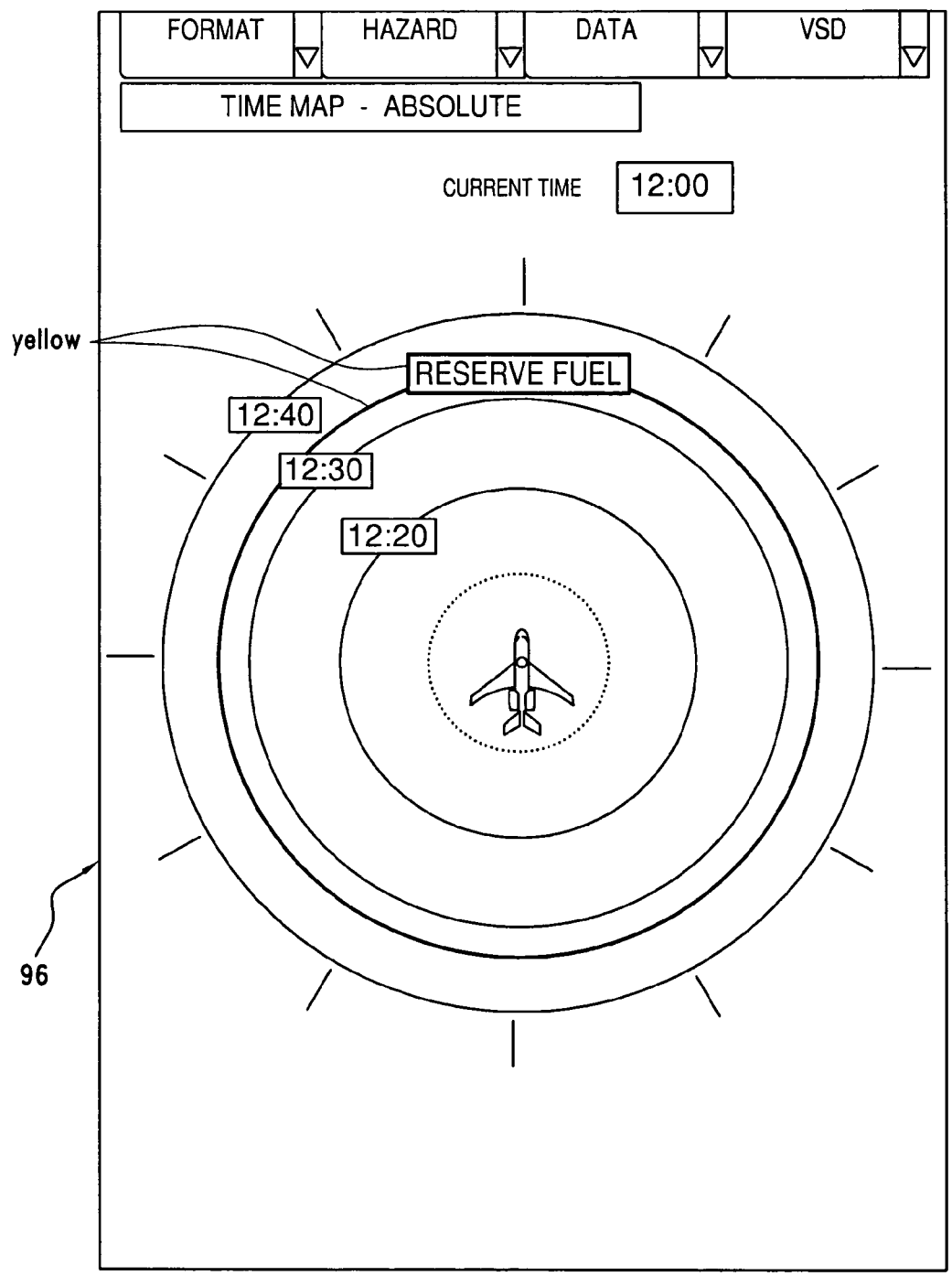
FIG. 14 shows the highlighting of a reserve fuel limit on a time/bearing map.

FIG. 14 shows how the reserve fuel point could be highlighted in yellow on a time/bearing map 96.

Figure 15:
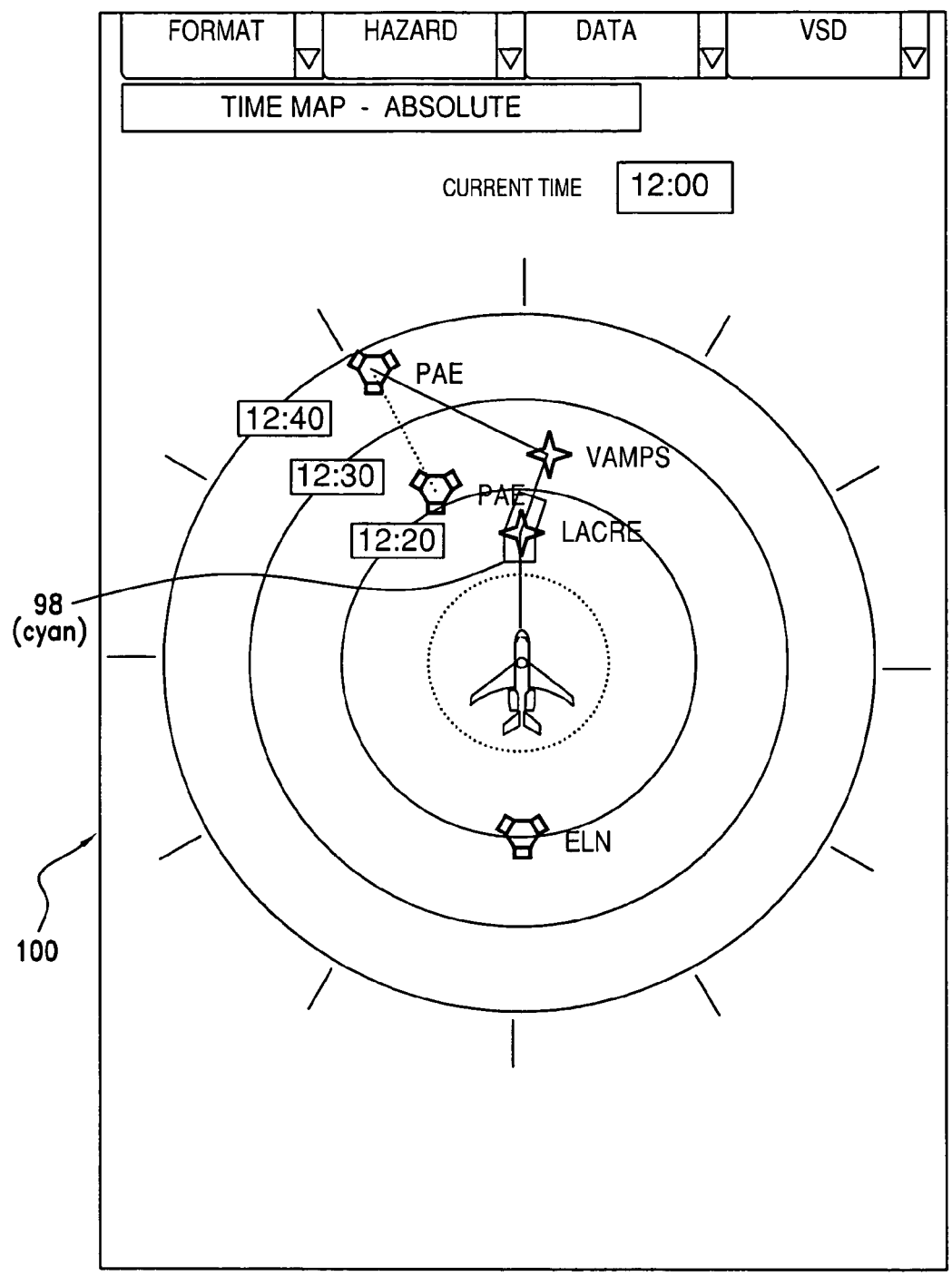
FIG. 15 illustrates an RTA time window 98 displayed on a time/bearing map.

FIG. 15 indicates how an RTA time window 98 could be displayed on a time/bearing map 100. Once a waypoint is designated, either graphically on the map or in the FMS, the earliest and latest arrival times can be shown by means of a the large, semi-transparent box (e.g. cyan box) around the designated waypoint. In this example, at present speed, the airplane will arrive at LACRE at about 12:15. The earliest arrival time is just about 12:12 and the latest arrival time is around 12:20.

Figure 16:
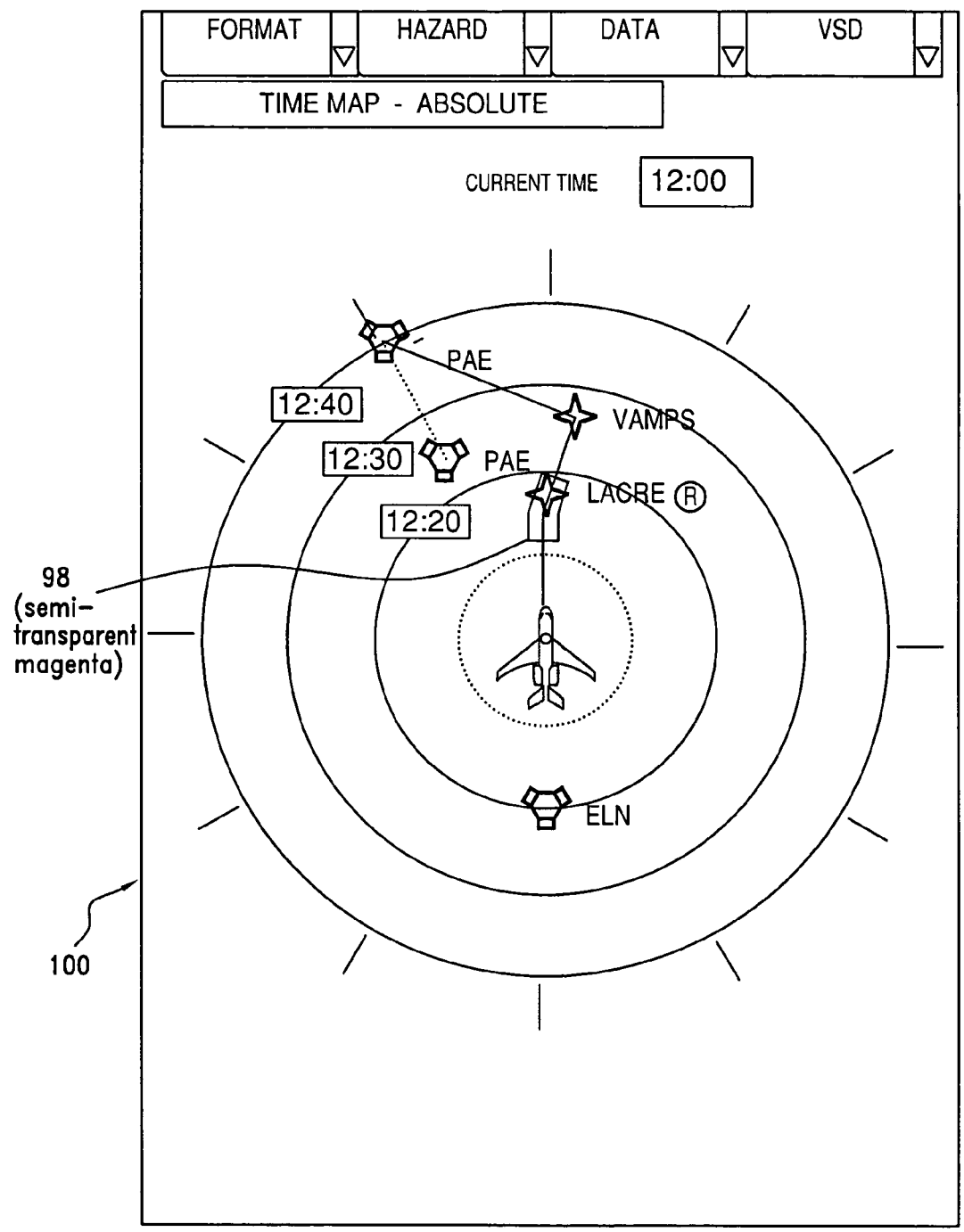
FIG. 16 illustrates the change in the RTA time window when the RTA is changed.

FIG. 16 depicts what happens if the pilot selects 12:19 as the RTA at LACRE. The waypoint would shift in time to 12:19, and the earliest/latest arrival times would be indicated by the ends of the box 98 (e.g. perhaps turning semi-transparent and magenta). Due to a decrease in cruise speed (to get to LACRE later), the subsequent waypoint (VAMPS) would also shift away in time. As the airplane gets closer to LACRE, the size of the box would shrink, until disappearing at waypoint crossing. Obviously, as the airplane gets closer to the waypoint, any change in cruise speed would have a diminishing effect on the arrival time.

Other embodiments and configurations may be devised without departing from the spirit of the invention and the scope of the appended claims.

The invention claimed is:

1. A flight display system for an avionics system of an aircraft, comprising:
    a navigation map, including a time window for a required time of arrival (RTA) waypoint, said time window comprising a spatial envelope having a proximal end indicating a spatial location of the aircraft's position at the RTA using a defined lowest speed and a distal end indicating a spatial location of the aircraft's position at the RTA using a defined highest speed.

2. The flight display system of claim 1 wherein said defined lowest speed comprises the slowest cruise speed and the defined highest speed comprises the highest cruise speed.

3. The flight display system of claim 1 wherein said time window is represented as a two-dimensional box.

4. The flight display system of claim 1 wherein said time window is represented as a three-dimensional tunnel.

5. The flight display system of claim 1 wherein said navigation map comprises lateral map.

6. The flight display system of claim 1 wherein said navigation map comprises vertical situation display.

7. A flight display system for an avionics system of an aircraft, comprising:
   a navigation map, including a pop-up time display for displaying at least one flight plan waypoint mapped out along a time line adjacent to a plurality of relative time markers, wherein said at least one waypoint scrolls along said time line during flight.

8. The flight display system of claim 7 wherein said navigation map comprises a two-dimensional Present Position (PPOS) navigation map.

9. The flight display system of claim 7 further including at least one absolute time marker.

10. The flight display system of claim 7 further comprising a waypoint time window presentable on said pop-up time display.

11. The flight display system of claim 7 further comprising a required time of arrival (RTA) waypoint time window presentable on said pop-up time display.

12. A flight display system for an avionics system of an aircraft, comprising:
   a full format time display for displaying at least one flight plan waypoint mapped out along a time line adjacent to a plurality of relative time markers, wherein said at least one waypoint scrolls along said time line during flight, said flight display system further comprising a required time of arrival (RTA) waypoint time window presentable on said full format time display.

13. The flight display system of claim 12 further comprising fuel consumption indicia presentable on said time line of said full format time map, said fuel consumption indicia comprising an icon representing the time left until reserve.

14. The flight display system of claim 12 further comprising fuel consumption indicia presentable on said time line of said full format time map, said fuel consumption indicia comprising an icon representing the time left until fuel exhaustion.

15. The flight display system of claim 12 further comprising airport indicia presentable on said time line of said full format time map in the event that an emergency landing is required, said airport indicia comprising icons representing the closet airports in time.

16. The flight display system of claim 12 wherein said time map is displayed in response to data provided by a navigation system.

17. The flight display system of claim 12 comprising multiple RTA waypoints.

18. A flight display system for an avionics system of an aircraft, comprising:
   a time/bearing map, comprising:
      a) a plurality of concentric range rings corresponding to selected times in the future;
      b) a plurality of radially spaced bearing ticks positioned at selected locations about said concentric rings; and,
      c) a relative time ring presentable about a central axis of said concentric rings, said relative time ring representing a fixed increment in time,
      wherein selected waypoints are presentable at their relative bearing to the airplane and at their time-range from the airplane.

19. The flight display system of claim 18 wherein said waypoints are connected by lines.

20. The flight display system of claim 18 wherein selected of said waypoints are presentable at a first position and a second position, said first position representing the current time-distance from the airplane and said second position representing the arrival time in accordance with the flight plan.

21. The flight display system of claim 18 further comprising a required time of arrival (RTA) waypoint time window presentable on said time/bearing map.

22. The flight display system of claim 12 further including at least one absolute time marker.

* * * * *